US012577843B2

(12) United States Patent
Shawli et al.

(10) Patent No.: US 12,577,843 B2
(45) Date of Patent: Mar. 17, 2026

(54) BACK PRESSURE VALVE RETRIEVAL TOOL AND METHODS OF USE

(71) Applicant: SAUDI ARABIAN OIL COMPANY, Dhahran (SA)

(72) Inventors: Yasser Saleh Shawli, Dhahran (SA); Abdulrahman H. Aljohani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 11 days.

(21) Appl. No.: 18/731,162

(22) Filed: May 31, 2024

(65) Prior Publication Data

US 2025/0369301 A1     Dec. 4, 2025

(51) Int. Cl.
| | |
|---|---|
| *E21B 31/00* | (2006.01) |
| *E21B 33/03* | (2006.01) |
| *E21B 34/02* | (2006.01) |
| *E21B 34/04* | (2006.01) |
| *E21B 37/00* | (2006.01) |
| *F16K 15/00* | (2006.01) |

(52) U.S. Cl.
CPC .............. *E21B 31/00* (2013.01); *E21B 33/03* (2013.01); *E21B 34/02* (2013.01); *E21B 34/04* (2013.01); *E21B 37/00* (2013.01); *F16K 15/00* (2013.01)

(58) Field of Classification Search
CPC .......... E21B 31/00; E21B 33/03; E21B 34/02; E21B 37/00; E21B 34/04; F16K 15/00
See application file for complete search history.

(56) References Cited

U.S. PATENT DOCUMENTS

| | | | | | |
|---|---|---|---|---|---|
| 1,831,393 | A | * | 11/1931 | Pierce, Jr. .......... | A46B 15/0002 211/DIG. 1 |
| 2,148,327 | A | * | 2/1939 | Smith ..................... | E21B 33/03 166/85.4 |
| 2,358,677 | A | * | 9/1944 | Yancey ................... | E21B 33/03 166/85.4 |
| 2,517,870 | A | * | 8/1950 | Gump ..................... | E21B 34/02 166/85.1 |
| 2,769,655 | A | * | 11/1956 | Holmes ................... | E21B 31/20 166/241.1 |
| 4,058,162 | A | * | 11/1977 | Smith ..................... | E21B 34/02 166/135 |
| 4,825,945 | A | * | 5/1989 | Smith ..................... | E21B 34/02 166/97.1 |

(Continued)

*Primary Examiner* — Neel Girish Patel

(74) *Attorney, Agent, or Firm* — Vorys, Sater, Seymour and Pease LLP

(57) ABSTRACT

A Back Pressure Valve (BPV) retrieval tool for retrieving Back Pressure Valve (BPV) comprises an elongated body, a magnetic ring that is attached to one end of the elongated body, and a thread profile cleaner tool that is fixed to the magnetic ring. The BPV retrieval tool is designed to attract and remove metal debris that may have fallen atop of the BPV, thereby preventing damage either to the BPV or the BPV retrieval tool while retrieving the BPV from the wellhead. The magnetic ring is configured to attract metal debris from area around a tubing hanger and top of the BPV, while running into the wellhead. The thread profile cleaner tool is configured to clean an inner profile thread of the BPV, while latching with the inner profile thread of the BPV, for providing a clean area on top of said BPV for successful latching.

15 Claims, 3 Drawing Sheets

(56)                    References Cited

U.S. PATENT DOCUMENTS

| | | | | |
|---|---|---|---|---|
| 5,474,124 | A | * | 12/1995 | Samuels ................. E21B 31/20 |
| | | | | 166/85.1 |
| 5,839,511 | A | * | 11/1998 | Williams ................ E21B 37/00 |
| | | | | 166/312 |
| 6,401,813 | B1 | * | 6/2002 | Carmichael ............. E21B 34/12 |
| | | | | 166/173 |
| 8,499,842 | B2 | * | 8/2013 | Nguyen .................. E21B 33/03 |
| | | | | 166/135 |
| 8,607,871 | B2 | * | 12/2013 | Coyle, Jr. ........... E21B 41/0078 |
| | | | | 166/173 |
| 2006/0081375 | A1 | * | 4/2006 | Ruttley .................. E21B 37/02 |
| | | | | 166/173 |
| 2012/0024521 | A1 | * | 2/2012 | Villa .................... E21B 33/068 |
| | | | | 166/75.11 |
| 2012/0193100 | A1 | * | 8/2012 | Coyle, Jr. .............. E21B 33/06 |
| | | | | 166/173 |
| 2015/0208889 | A1 | * | 7/2015 | Kimmerle .......... A46B 15/0026 |
| | | | | 15/179 |
| 2016/0186527 | A1 | * | 6/2016 | Cocker, III ....... E21B 23/04115 |
| | | | | 166/97.1 |
| 2019/0360292 | A1 | * | 11/2019 | Boyd ...................... E21B 33/03 |
| 2021/0246762 | A1 | * | 8/2021 | Paton ..................... E21B 31/06 |
| 2023/0228167 | A1 | * | 7/2023 | Pang ...................... E21B 34/02 |
| | | | | 166/250.01 |
| 2024/0191600 | A1 | * | 6/2024 | Karakaya ................ E21B 37/00 |
| 2024/0309719 | A1 | * | 9/2024 | Karakaya ................ E21B 33/04 |
| 2025/0257971 | A1 | * | 8/2025 | Nielsen .................. F41A 29/02 |

* cited by examiner

BACK PRESSURE VALVE RETRIEVAL TOOL AND METHODS OF USE

FIELD OF THE DISCLOSURE

The present disclosure relates generally to back pressure valve (BPV) retrieval tools and, more particularly, to a magnetic BPV retrieval tool that maintains the BPV free from debris or metals during BPV retrieval.

BACKGROUND OF THE DISCLOSURE

Throughout the lifetime of an oil and gas well, proper sealing and pressure isolation equipment is required to prevent undesirable fluid flow out of the system, including oil, gas, injection fluids, and formation water. One common mechanical barrier utilized in sealing a wellhead of an oil and gas well is a back pressure valve (BPV). The BPV is typically secured within a specially machined profile in the bore of a tubing hanger, where the tubing hanger is arranged within a tubing head adapter, which forms part of the wellhead or wellhead installation. A production tree (alternately referred to as a "Christmas tree") is commonly attached to the top of the tubing head adapter to control flow into and out of the wellbore extending from the wellhead.

The BPV operates as a one-way check valve designed to isolate the well pressure from below while enabling at least a small amount of fluid to flow from above; i.e., from the Christmas tree. In some applications, for example, and depending on design, the BPV can allow pumping through the tubing to kill any undesired flow or pressure. Moreover, the BPV allows for the safe exchange or repair of valves included in the wellhead and Christmas tree without lengthy and costly kill operations to eliminate well pressure. Furthermore, the BPV can also provide well control at certain stages of completion and de-completion operations, as well as an extra level of safety when potential surface damage to the Christmas tree or wellhead exists.

During retrieval of BPVs, metal objects and debris within the interior of the wellhead can sometimes be encountered by the BPV retrieval tools. Such metal and debris can hinder retrieval, damage the retrieval tool, and potentially damage the BPV.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a back pressure valve retrieval tool is described and includes an elongated body having opposing upper and lower ends, and a lower attachment member extending axially from the lower end and sized to be received by a back pressure valve arranged within a wellhead, and a magnet arranged at the lower end and operable to attract ferromagnetic debris present within the wellhead and on top of the back pressure valve.

According to another embodiment consistent with the present disclosure, a method is described and includes the steps of lowering a back pressure valve retrieval tool into an interior of a wellhead, the back pressure valve retrieval tool including an elongated body having opposing upper and lower ends, and a lower attachment member extending axially from the lower end, and a magnet arranged at the lower end. The method may further include the steps of approaching a back pressure valve arranged within the wellhead, attracting ferromagnetic debris present within the wellhead to the magnet and thereby clearing the ferromagnetic debris from the back pressure valve, and locating and receiving the lower attachment member within the back pressure valve.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
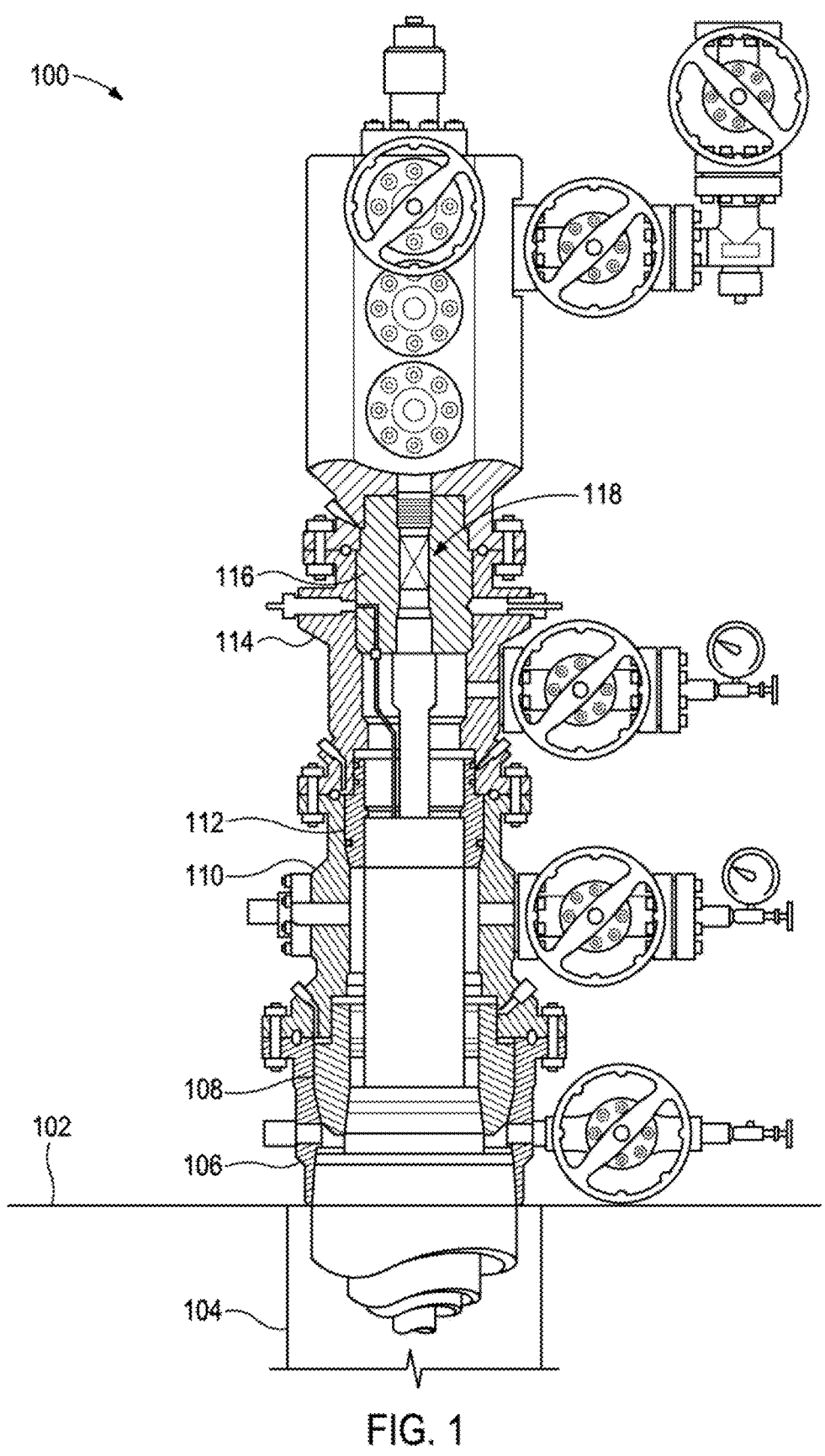
FIG. 1 depicts a schematic view of an example wellhead that may be used in accordance with the principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a back pressure valve (BPV) retrieval tool. The BPV retrieval tool disclosed herein includes a thread profile cleaner tool operable to clean the top of an installed BPV of any metal and/or debris (e.g., ferromagnetic debris) that may be present, and further clean the internal thread profile of the installed BPV. Moreover, the BPV retrieval tool disclosed herein may further include a magnet operable to attract magnetic metals, and thereby keep the area around the tubing hanger and the top of BPV free of any debris or metals. Using the presently disclosed BPV retrieval tool may help eliminate or reduce additional runs into the wellhead caused by the presence of metal or debris that may have fallen therein and would otherwise frustrate the BPV retrieval process.

FIG. 1 depicts a schematic view of an example wellhead 100 that may be used in accordance with the principles of the present disclosure. The wellhead 100 may be arranged at a well surface location 102 (e.g., land based, floating platform, subsea, etc.) and a wellbore 104 extends from the wellhead 100 and penetrates one or more subterranean formations. The wellhead 100 helps facilitate hydrocarbon production from the well, but also provides a means of introducing downhole tools and fluids into the wellbore extending therefrom.

As illustrated, the wellhead 100 includes a casing head housing 106 with a casing hanger 108 secured therein. The wellhead 100 may further includes a casing head 110 secured to the top of the casing head housing 110, and a casing hanger 112 may be secured within the casing head housing 110. The wellhead 100 further includes a tubing head adapter 114 which is secured to the top of the casing head housing 110, and a tubing hanger 116 which is secured within the tubing adapter 114. In the illustrated figure, a back pressure valve or "BPV" 118 (generically shown as a box) is received within the tubing hanger 116 and, more particularly, within a specially machined profile within the bore of the tubing hanger 116. In such embodiments, the BPV 118 may comprise a type H back pressure valve that is threaded into a corresponding threaded interface (profile) of the tubing hanger 116. In other embodiments, however, the BPV 118 may be installed in a plug bushing or the like forming part of the wellhead 100.

Once installed, the BPV 118 helps prevent the escape of well fluids or gases from the wellbore 104 to the surrounding environment. The BPV 118 is an essential component for maintaining well control during production and well completion/stimulation operations, thereby preventing uncontrolled releases of well fluids or gases that could endanger personnel and the environment. As needed, the BPV 118 may be installed and removed from the wellhead 100 using a BPV retrieval tool operatively coupled to a corresponding running tool.

Figure 2:
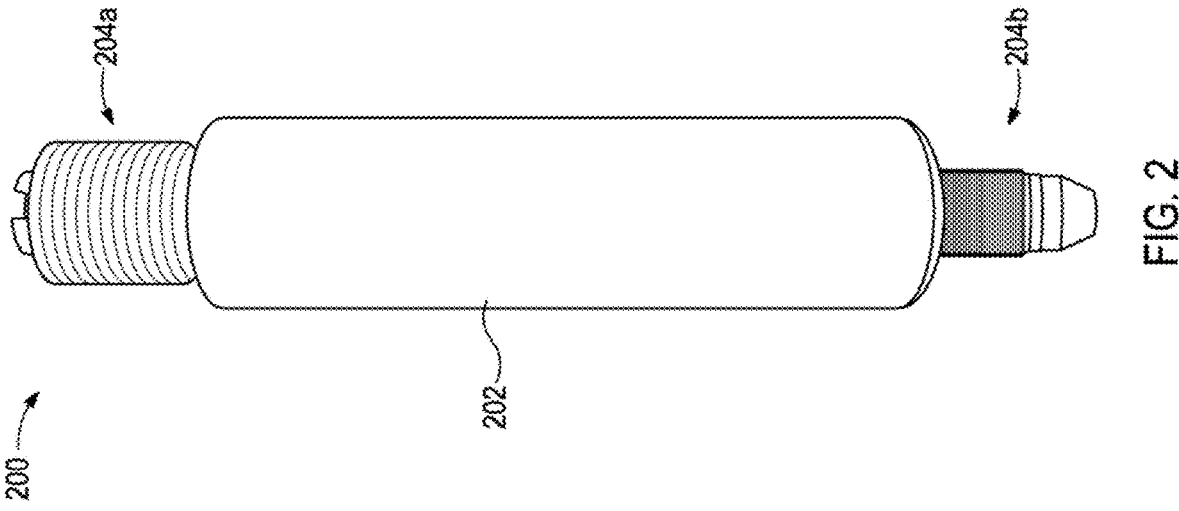
FIG. 2 is a side view of an example BPV retrieval tool.

FIG. 2 is a side view of an example BPV retrieval tool 200, which may be used to remove the BPV 118 (FIG. 1) from the wellhead 100 (FIG. 1). As illustrated, the BPV retrieval tool 200 (hereafter "the retrieval tool 200") includes an elongate, cylindrical body 202 having a first or "upper" end 204a and a second or "lower" end 204b opposite the upper end 204a. The upper end 204a may be configured to be operatively coupled to a running tool (not shown) operable to convey the retrieval tool 200 into and out of the wellhead 100. In at least one embodiment, as illustrated, the upper end 204a may be threaded and configured to threadably engage corresponding threaded portions of the running tool. In other embodiments, however, the upper end 204a may be operatively coupled to the running tool in other conventional ways.

The lower end 204b of the body 202 may be configured to locate and engage the BPV 118 (FIG. 1) and thereby facilitate the releasable attachment of the retrieval tool 200 to the BPV 118. In some embodiments, as illustrated, all or a portion of the lower end 204b may be threaded and thereby configured to threadably engage corresponding internal threads defined by the BPV 118. In the event that ferromagnetic debris is present within the wellhead 100 (FIG. 1) at the BPV 118, however, the retrieval tool 200 may have difficulty locating and properly engaging (latching into) the BPV 118. For example, ferromagnetic debris can sometimes inadvertently fall into the wellhead 100 after drilling operations, while erecting the wellhead 100, while changing out various portions above the wellhead 100 (e.g., the Christmas tree), and/or after completing well intervention operations. In such scenarios, the ferromagnetic debris present within the wellhead 100 may obstruct or entirely prevent proper engagement (latching into) of the lower end 204b of the retrieval tool 200 with the BPV 118. Moreover, such ferromagnetic debris can damage the threaded lower end 204b, thereby rendering the retrieval tool 200 inoperable.

According to embodiments of the present disclosure, an improved BPV retrieval tool is disclosed and described herein that avoids or prevents the aforementioned problems with conventional retrieval tools. Embodiments of the retrieval tool described herein include one or more magnets operable to attract of any metal objects that may have fallen into the wellhead 100 (FIG. 1), thus cleaning the area on top of the BPV and keeping the area around the tubing hanger 116 (FIG. 1) and the top of the BPV 118 (FIG. 1) free of any debris or metals.

Figure 3:
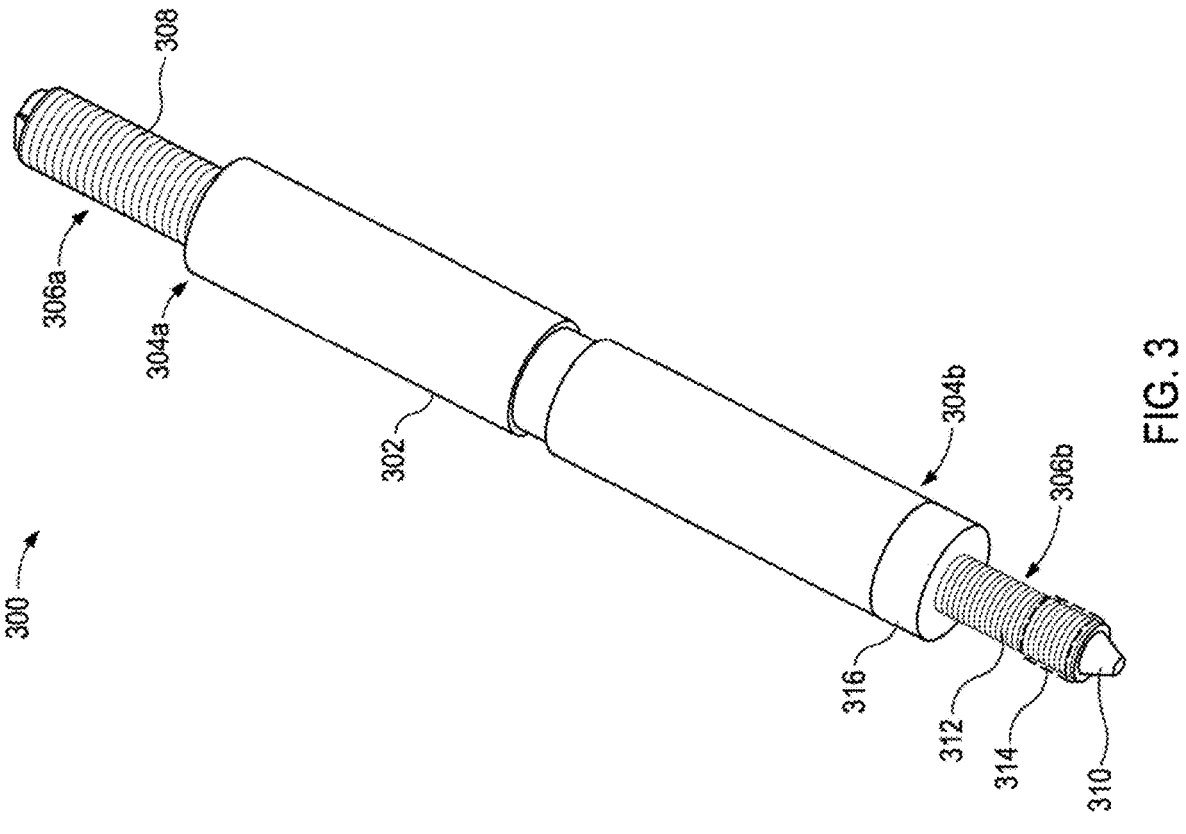
FIG. 3 is an isometric side view of an example BPV retrieval tool, according to one or more embodiments of the present disclosure.

FIG. 3 is an isometric side view of an example BPV retrieval tool 300 in accordance with the principles of the present disclosure. As illustrated, the BPV retrieval tool 300 (hereafter, "the retrieval tool 300") includes an elongated, cylindrical body 302 having a first or "upper" end 304a and a second or "lower" end 304b opposite the upper end 304a. The upper end 304a may be configured to be attached to a running tool (not shown) operable to convey the retrieval tool 300 into or out of the wellhead 100 (FIG. 1). In at least one embodiment, for example, an upper attachment member 306a may extend axially from the upper end 304a and may provide and otherwise define external threading 308 configured to threadably engage internal threading corresponding to the running tool. In other embodiments, however, the external threading 308 may be omitted and the upper attachment member 306a may be operatively coupled to the running tool in other ways, such as using mechanical fasteners, a mechanical interface, a bayonet connection, etc.

The lower end 304b of the body 302 may be configured to locate and engage the BPV 118 (FIG. 1) and thereby releasably attach the retrieval tool 300 to the BPV 118. As illustrated, a lower attachment member 306b may extend axially from the lower end 304b and may include and otherwise provide a bullnose 310 that helps locate the BPV 118 and guide the lower attachment member 306b into the interior of the BPV 118. Moreover, in some embodiments, all or a portion of the lower attachment member 306b may provide and otherwise define external threading 312 configured to threadably engage internal threads defined within the interior of the BPV 118.

In some embodiments, the retrieval tool 300 may further include a thread profile cleaner tool 314 (shown in dashed lines) provided on the lower attachment member 306b. In some embodiments, the thread profile cleaner tool 314 may be arranged distal to (downhole from) the external threading 312. In other embodiments, however, the external threading 312 may be combined with the thread profile cleaner tool 314. The thread profile cleaner tool 314 may be configured to clean the top of the BPV 118 (FIG. 1) and the internal threads of the BPV 118 of ferromagnetic debris that may be present within the wellhead 100 (FIG. 1). In some embodiments, for example, the thread profile cleaner tool 314 may comprise a threaded interface configured to threadably connect lower attachment member 306b to the BPV 118, while simultaneously cleaning the internal threaded profile of the BPV 118 during connection (rotation). In other embodiments, or in addition thereto, the thread profile cleaner tool 314 may comprise a brush or a series of brushes fixedly attached to the lower attachment member 306b. In at least one embodiment, a plurality of brushes may be disposed about the outer circumference of the lower attachment member 306b. The layout of the brush(es) on the surface of the lower attachment member 306b can be provided in a variety of design patterns operable to aid in efficient cleaning of the top and inner thread profile of the BPV 118.

As the lower attachment member 306*b* approaches the top of the BPV 118 and is initially received within the interior of the BPV 118, the retrieval tool 300 is rotated and the brush(es) forming part of the thread profile cleaner tool 314 may be configured to clean the top of the BPV 118 and the internal threading of the BPV 118 of any ferromagnetic debris that may be present at those locations as the lower attachment member 306*b* is threaded into the corresponding threaded profile of the BPV 118. In at least one application, the brush(es) may loosen or dislodge the ferromagnetic debris that may be present at those locations for subsequent magnetic attraction and removal, as discussed below. In some embodiments, the brush(es) forming part of the thread profile cleaner tool 314 may be flexible and otherwise capable of entering the interior of the BPV 118 to be able to brush and clean the internal threads of the BPV 118.

In some embodiments, the retrieval tool 300 may further include one or more magnets 314 coupled to or otherwise forming part of the body 302 at or near the lower end 304*b*. The magnet 314 may be operatively coupled to the lower end 304*b* via a variety of coupling means including, but not limited to, one or more mechanical fasteners, welding, soldering, an interference fit, a mechanical engagement, an adhesive, or any combination thereof. In some embodiments, the magnet 314 may axially interpose the lower end 304*b* and the lower attachment member 306*b*. In such embodiments, the lower attachment member 306*b* may be operatively coupled to and extend from the magnet 314. In other embodiments, however, the magnet 314 may be in the form of a ring received over and otherwise arranged about a portion of the lower attachment member 306*b*. In such embodiments, the magnet 314 may be mounted to the lower attachment member 306*b* using one or more mechanical fasteners, welding, soldering, an interference fit, a shrink fit, a mechanical engagement, an adhesive, or any combination thereof.

In some embodiments, as illustrated, the magnet 314 may exhibit a size or outer diameter substantially similar to the outer diameter of the lower end 304*b* of the body 302. In other embodiments, however, the magnet 314 may exhibit a size or outer diameter that is different from the lower end 304*b* of the body 302, without departing from the scope of the disclosure. The magnet 314 can exhibit a variety of sizes and may be provided to facilitate an effective magnetic attraction for the metal debris cleaning. For example, the size of the magnet 314 can be optimized based on various parameters such as size of the BPV 118 and the size of the tubing hanger 116. While shown in FIG. 3 as exhibiting a generally circular cross-section, it is contemplated herein that the magnet 314 could alternatively exhibit a polygonal cross-section, such as square, pentagonal, etc.

In example operation, the magnet 314 may be configured to magnetically attract metal parts and debris as the retrieval tool 300 is introduced (lowered) into the wellhead 100 (FIG. 1), and thereby remove such metal parts and debris from the area around the tubing hanger 116 (FIG. 1) and the top of the BPV 118 (FIG. 1) while running into the wellhead 100. More specifically, when the retrieval tool 300 is lowered into the wellhead 100, the magnet 314 attracts ferromagnetic materials and debris from the top of the BPV 118, which helps clean (expose) this area and allows the bullnose 310 to properly locate and be received within the interior of the BPV 118. In one or more embodiments, as mentioned above, the brush(es) forming part of the thread profile cleaner tool 314 may help loosen or dislodge ferromagnetic material that may be present on top of the BPV 118 and/or within the interior thereof to help facilitate the magnetic attraction and removal of such ferromagnetic material. Accordingly, the magnet 314 may also attract ferromagnetic materials present within the interior of the BPV 118, thereby allowing the external threading 312 defined on the lower attachment member 306*b* to properly engage the internal threads defined within the interior of the BPV 118.

The magnet 314 may comprise any type of magnet capable of attracting ferromagnetic materials. Examples of the magnet 314 include, but are not limited to, a permanent magnet, an electromagnet, a paramagnetic material, or any combination thereof.

In embodiments where the magnet 314 comprises an electromagnet, the retrieval tool 300 may further include an internal power source 316 configured to provide the necessary electrical power to operate the electromagnet. The power source 316 can include, for example, one or more batteries or fuel cells. In other embodiments, however, the internal power source 316 may be omitted and the electromagnet may instead be powered via a direct power line extending from a source of grid power or a generator. Moreover, in embodiments where the magnet 314 comprises an electromagnet, the electromagnet may be operated via remote or direct control, and may be automated or selectively operated by a user. Embodiments where the magnet 314 comprises an electromagnet may be advantageous since the magnet 314 may be operated only as needed, thus not attracting ferromagnetic materials until arranged adjacent the BPV 118 (FIG. 1).

Figure 4:
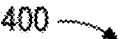
FIG. 4 is a schematic flowchart of an example method for providing a clean area on top of a back pressure valve using the retrieval tool disclosed herein.
Figure 4:
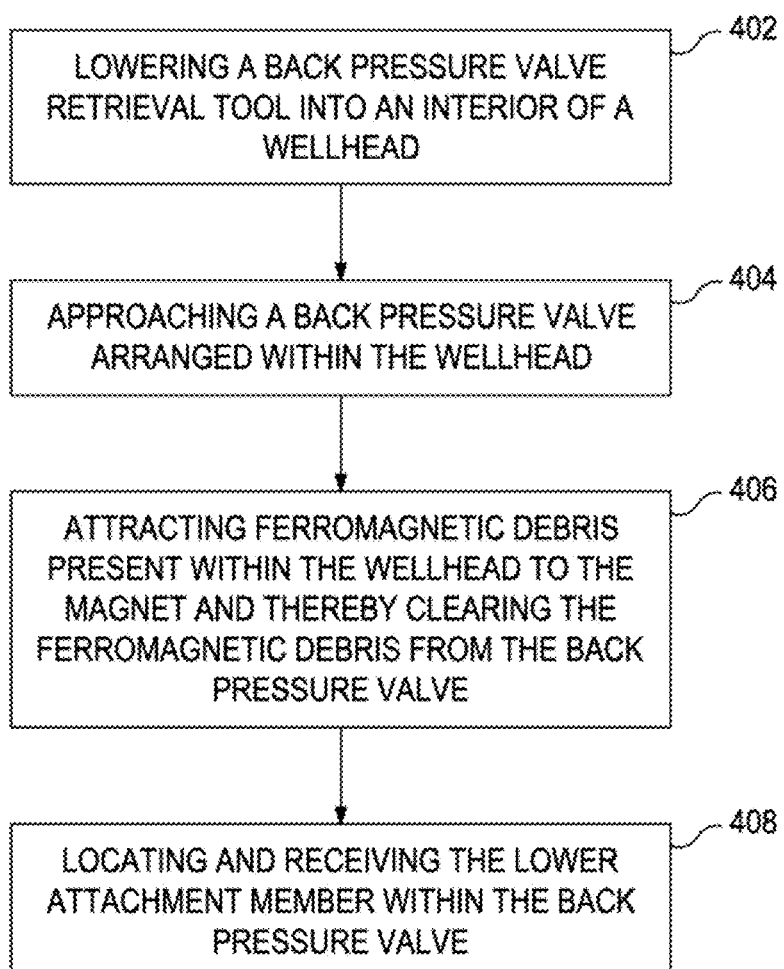

FIG. 4 is a schematic flowchart of an example method 400 for providing a clean area on top of a back pressure valve using the retrieval tool 300 disclosed herein. As illustrated, the method 400 may include lowering a back pressure valve retrieval tool into an interior of a wellhead, as at 402. As described herein the back pressure valve retrieval tool may include an elongated body having opposing upper and lower ends, and a lower attachment member extending axially from the lower end, and may further include a magnet arranged at the lower end. The method 400 may further include approaching a back pressure valve arranged within the wellhead, as at 404, and attracting ferromagnetic debris present within the wellhead to the magnet and thereby clearing the ferromagnetic debris from the back pressure valve, as at 406. The method 400 may further include locating and receiving the lower attachment member within the back pressure valve, as at 408.

Therefore, the retrieval tool 300 described herein may comprise a magnetic retrieval tool configured to allow cleaning the area on top of a back pressure valve by utilizing the magnetic attraction of any metal objects that may have fallen atop the back pressure valve. The magnetic properties of the retrieval tool 300 can attract any type of magnetic (ferromagnetic) metals, thereby keeping the area around the tubing hanger and the top of back pressure valve free of any debris or metals. In addition, the retrieval tool 300 includes an inner thread profile cleaner to assure successful latching by creating a clean area on top of the back pressure valve. The retrieval tool 300 can eliminate and reduce any extra runs by attracting ferromagnetic fallen objects, thus eliminating the need for extra runs to clear debris, saving time and money, and thereby improving efficiency.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

The use of directional terms such as above, below, upper, lower, upward, downward, left, right, up-hole, downhole and the like are used in relation to the illustrative embodiments as they are depicted in the figures, the upward direction being toward the top of the corresponding figure and the downward direction being toward the bottom of the corresponding figure, the up-hole direction being toward the surface of the well and the downhole direction being toward the toe of the well.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A back pressure valve retrieval tool, comprising:
an elongated body having opposing upper and lower ends, and a lower attachment member extending axially from the lower end and sized to be received by a back pressure valve arranged within a wellhead;
a magnet arranged at the lower end and operable to attract ferromagnetic debris present within the wellhead and on top of the back pressure valve, wherein the magnet comprises a ring arranged about a portion of the lower attachment member; and
a flexible cleaner tool provided on a distal end of the lower attachment member and extending radially therefrom so that the flexible cleaner tool is operable to loosen or dislodge the ferromagnetic debris from the back pressure valve.

2. The back pressure valve retrieval tool of claim 1, wherein at least a portion of the lower attachment member defines external threading, and wherein the cleaner tool is arranged distal to the external threading.

3. The back pressure valve retrieval tool of claim 1, wherein at least a portion of the lower attachment member defines external threading, and wherein the cleaner tool is combined with the external threading.

4. The back pressure valve retrieval tool of claim 1, wherein the magnet axially interposes the lower end and the lower attachment member.

5. The back pressure valve retrieval tool of claim 1, wherein the magnet exhibits an outer diameter similar to an outer diameter of the lower end of the body.

6. The back pressure valve retrieval tool of claim 1, wherein the magnet is selected from the group consisting of a permanent magnet, an electromagnet, a paramagnetic material, and any combination thereof.

7. The backpressure retrieval tool of claim 1, further comprising a bullnose provided on the lower attachment member to locate and be received within an interior of the back pressure valve.

8. A back pressure valve retrieval tool, comprising:
an elongated body having opposing upper and lower ends, and a lower attachment member extending axially from the lower end and sized to be received by a back pressure valve arranged within a wellhead;
a magnet arranged at the lower end and operable to attract ferromagnetic debris present within the wellhead and on top of the back pressure valve; and
a threaded profile cleaner tool provided on the lower attachment member and comprising one or more brushes attached to the lower attachment member.

9. The back pressure valve retrieval tool of claim 8, wherein the one or more brushes are flexible and capable of entering an interior of the back pressure valve.

10. The back pressure valve retrieval tool of claim 8, wherein at least a portion of the lower attachment member defines external threading, and wherein the one or more brushes are arranged distal to the external threading.

11. A method, comprising:
lowering a back pressure valve retrieval tool into an interior of a wellhead, the back pressure valve retrieval tool including:
an elongated body having opposing upper and lower ends, and a lower attachment member extending axially from the lower end;
a magnet arranged at the lower end; and
flexible cleaner tool provided on a distal end of the lower attachment member and extending radially therefrom;
approaching a back pressure valve arranged within the wellhead;
engaging the ferromagnetic debris with the flexible cleaner tool and thereby helping to clear the ferromagnetic debris from the back pressure valve;
attracting ferromagnetic debris present within the wellhead to the magnet and thereby clearing the ferromagnetic debris from the back pressure valve; and
locating and receiving the lower attachment member within the back pressure valve.

12. The method of claim 11, wherein the cleaner tool comprises one or more brushes attached to the lower attachment member, the method further comprising loosening or dislodging the ferromagnetic debris present within the well-head with the one or more brushes.

13. The method of claim 12, further comprising advancing the one or more brushes into an interior of the back pressure valve and thereby helping to clean internal threading provided by the back pressure valve.

14. The method of claim 11, wherein attracting the ferromagnetic debris present within the wellhead to the magnet comprises removing the ferromagnetic material from a top of the back pressure valve and thereby allowing a bullnose provided on the lower attachment member to locate and be received within an interior of the back pressure valve.

15. The method of claim 11, wherein engaging the ferromagnetic debris with the flexible cleaner tool comprises rotating back pressure valve retrieval tool as the lower attachment member is received within the back pressure valve.

\* \* \* \* \*